United States Patent [19]

Stoneburner

[11] 4,110,759

[45] Aug. 29, 1978

[54] ORIFICE PLATE HOLDER FOR A FLUID JET PRINTING APPARATUS

[75] Inventor: Leonard G. Stoneburner, Fairborn, Ohio

[73] Assignee: The Mead Corporation, Dayton, Ohio

[21] Appl. No.: 765,116

[22] Filed: Feb. 3, 1977

[51] Int. Cl.$^2$ .............................................. G01D 15/18

[52] U.S. Cl. ....................................................... 346/75

[58] Field of Search .................................. 346/75, 140

[56] References Cited

U.S. PATENT DOCUMENTS 3,739,393 6/1973 Lyon .................................. 346/75 X 3,882,508 5/1975 Stoneburner .......................... 346/75

*Primary Examiner*—Joseph W. Hartary

*Attorney, Agent, or Firm*—Biebel, French & Nauman

[57] ABSTRACT

An orifice plate holder for use in the printing head of a jet drop printing apparatus which uses an orifice plate stimulated with a traveling wave to produce uniformly spaced drops of fluid for printing. The holder has at least one built in dampening device in the form of a sharply tapered end portion in a central elongated opening coextensive with and abutting the vibrating portion of the orifice plate. The tapered end portion acts as a damper to substantially attenuate the incoming traveling wave without causing a significant reflection.

11 Claims, 13 Drawing Figures

ORIFICE PLATE HOLDER FOR A FLUID JET PRINTING APPARATUS

BACKGROUND OF THE INVENTION

1. Field of the Invention

The present invention relates generally to the field of fluid drop generation and more particularly, to jet drop recording heads of the type disclosed in Lyon et al U.S. Pat. Nos. 3,739,393 and Stoneburner 3,882,508.

2. Prior Art

In recorders of the type referred to above, there are one or more rows of orifices which receive an electrically conductive recording fluid, such as for instance a water base ink, from a pressurized fluid supply manifold and eject the fluid in rows of parallel streams. These recorders accomplish graphic reproduction by selectively charging and deflecting the drops in each of the streams and thereafter depositing at least some of the drops on the moving web of paper.

Substantial investigative effort has been directed to the area of drop stimulation, since this is one of the more difficult and troublesome aspects of the apparatus. Advancements have been made in the art of controlling the uniformity of drops and drop separation by the developments disclosed in the above two referred to patents. The basic construction of the jet drop recording heads disclosed in these two patents comprises an orifice plate of generally thin rectangular construction, a corresponding substantially thicker holder to which the orifice plate is secured, a stimulation device for creating the wave motion in the orifice plate and a reservoir of fluid disposed above the orifice plate for supplying a supply of working fluid to the orifices which is expelled through the orifices in a controlled manner by stimulation of appropriate wave vibration patterns in the orifice plate.

One particular difficulty associated with this arrangement is the occurrence of reflected wave motion along the vibrating surface of the orifice plate, which tends to interfere with the primary wave motion and causes a lack of uniformity in the size of the drops or distance between drops, or produces what is referred to as "satellite" drops which are relatively small droplets that are formed after a large drop has formed.

To alleviate this problem, it has been common in the past to employ a separate acoustical "bumper" at each end of the vibrating portion of the orifice plate and in contact therewith, which absorbs the wave motion at each end of the plate, thus suppressing secondary, backwardly traveling reflections of the primary wave motion. The bumpers are usually formed of a plastic or rubber like material which must be adhered to or formed on the orifice plate within the corresponding openings in the holder.

In the past, the use of such bumpers has proved to be a problem in that after prolonged use the bumpers tend to deteriorate contaminating the inking material, and thus clogging the orifices.

SUMMARY OF THE INVENTION

The present invention overcomes the above described difficulties and disadvantages associated with the prior art devices by providing an orifice plate holder with at least one sharply tapered end portion directly abutting the vibrating portion of the orifice plate. It has been discovered that the tapering of the end portions of the opening in the holder in a sharp taper, substantially attenuates the incoming traveling wave without reflection in a manner comparable to the use of prior art bumpers, but without the associated deficiencies therein.

In one embodiment of the present invention, only one end of the opening in the orifice plate holder corresponding to the vibrating portion of the orifice plate is sharply tapered. It has been discovered that when the orifice plate is stimulated at one end it is only necessary to have a tapered opening in the orifice plate holder at the end opposite the end where the stimulation is induced. However, this does not preclude the use of a sharp taper on both ends of the opening in the orifice plate holder above the corresponding vibrating portion of the orifice plate, if this is desired.

Whether or not a tapered end portion in the opening of the holder is necessary on both ends, may depend upon the exact position of the stimulator relative to the length and width of the vibrating portion of the orifice plate. The opening defined in the orifice plate holder exclusive of the sharply tapered end portions, may be either straight parallel walls or gradually tapered walls extending from one sharply tapered end portion to the opposite sharply tapered end portion. The usefullness of the gradual taper is disclosed in United States Patent No. 3,882,508 and will not be discussed in detail herein. However, generally, it increases the acoustic energy density to compensate the normal attenuation of the wave propagation through the vibrating portion of the orifice plate by narrowing the vibrating portion of the plate as it proceeds remotely from the position of initial stimulation. Again, with the tapered configuration it may only be necessary to utilize one sharply tapered end portion remote from the point of stimulation of the vibrating portion of the orifice plate.

Exact parameters for establishing the length of sharp taper and degree of taper of the end portions of the central opening in an orifice plate holder have not been ascertained, and mathematical analysis has not yet yielded results which would provide effective guidance in designing a specifically dimensioned orifice plate and orifice plate holder having a sharp tapered end portion of the opening in the holder, which would suffice to substantially suppress rearward reflection of the stimulated wave motion. However, to the extent that experimentation has been conducted, it is apparent that the sharply tapered portion is about 2 to 3 wavelengths in length and tapers from a width greater than the width of orifice plate which will support first mode vibration but not wide enough to support second mode vibration to substantially a point.

Many parameters affect the length and positioning of the sharply tapered end portions, including thickness of the plate, dimensions of the vibrating surface portion of the orifice plate, frequency and amplitude of stimulated wave vibrations within ranges for a specific design, position of contact of the stimulating device with the orifice plate, and material characteristics such as natural frequency and density. In general it is quite difficult to predict the performance of a dampening taper of any particular dimensions, as the mathematical relationship of the above mentioned parameters is quite complex. However, it is a rather simple matter to establish such performance experimentally and thus establish design criteria by that approach. All that is necessary is to attach an orifice plate to a manifold having a taper of interest and to pump ink thereto. The orifice plate is stimulated as taught by Stoneburner and jet filaments are observed by a microscope.

For a properly stimulated and dampened arrangement the filaments will be of uniform length and will be stimulated with a slight jet-to-jet phase shift. Observation of the filament length and the stimulation phase is facilitated by stroboscopic illumination synchronized with the stimulation driving signal. This technique enables optimization of the taper for any particular recording head with relatively few experimental trials.

DETAILED DESCRIPTION OF THE PREFERRED EMBODIMENTS

Figure 1:
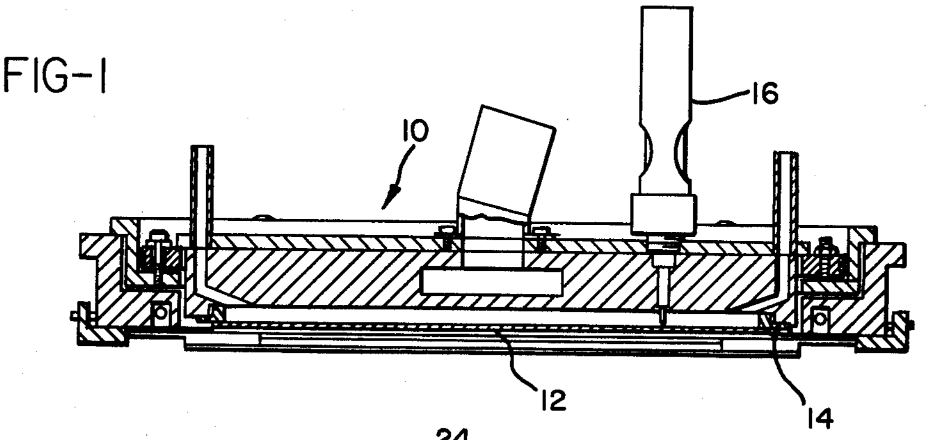
FIG. 1 is a front elevational view in cross section of a recording head of the type in which the present invention is utilized.
Figure 2:
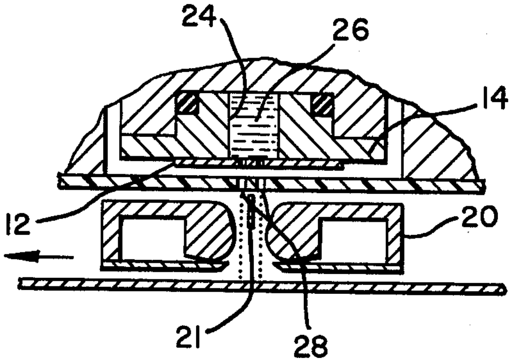
FIG. 2 is a view along line 2—2 of the recording head illustrated in FIG. 1.

In FIG. 1 is illustrated a recording head 10 of the general type conventionally utilized in jet drop printing and recording apparatus such as the type shown in Sweet et al U.S. Pat. Nos. 3,373,437 and in Taylor et al 3,560,641. Recording head 10 generally comprises an orifice plate 12 supported by an orifice plate holder 14 and vibrated by a stimulating device 16, a charge ring plate 18 disposed below and spaced from the orifice plate 12 for placing a charge on selected drops, a catcher 20 and a deflection ribbon 21 for deflecting toward catcher 20 those drops 22 which have been charged by the charge ring plate.

Contained within the orifice plate holder 14 is a reservoir 24 which holds a supply of working fluid 26 such as a water base ink. The working fluid is expelled through the orifices 28 in orifice plate 12. Working fluid inlet and outlet 30 and 32, respectively, provide a circulating supply of working fluid to the reservoir 24.

Figure 3:
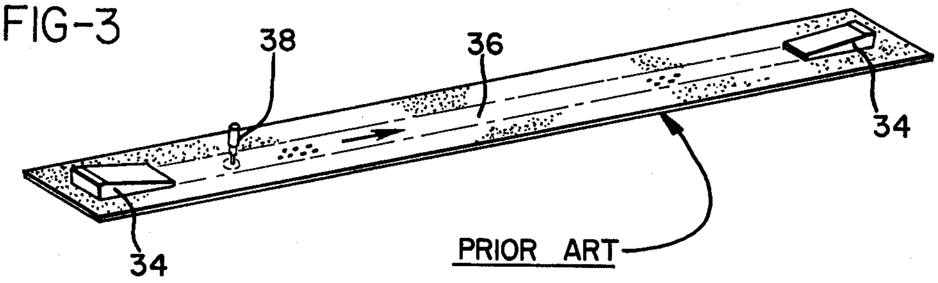
FIG. 3 is a pictorial view of an orifice plate and acoustical bumpers utilized in the prior art.
Figure 4:
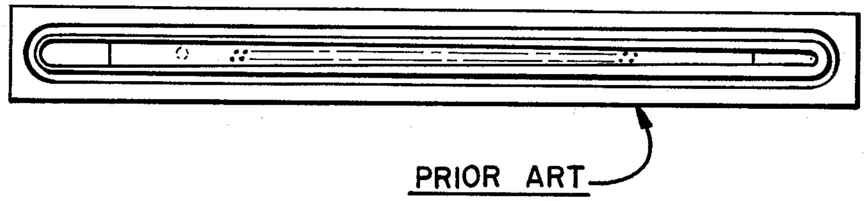
FIG. 4 is a top plan view of the orifice plate of FIG. 3 and an orifice plate holder incompessing the acoustical bumpers utilized in the prior art.

An orifice plate 12 of the type utilized in the prior art is illustrated in FIG. 3 with acoustical dampers 34 secured to the orifice plate at each end of the vibrating portion 36. Acoustical bumpers 34 suppress reflected waves ordinarily produced when the primary waves reach the end portion of the vibrating portion of the orifice plate. The primary waves of vibration used to produce uniform drops of working fluid are produced by stimulation of the vibrating portion 36 by means of contact between the tip 38 of the stimulator means 16 and the surface of the orifice plate 12. The acoustical dampers 34 are generally made from a relatively resilient, rubber-like or plastic material such as polyurethane, which absorbs the wave motion and substantially reduces the reflected waves which travel through the orifice plate against the direction of the main wave generation.

The acoustical dampers 34 are preferably formed after the orifice plate and orifice plate holder have been assembled. This can be accomplished by placing a liquidfied form of the material in the end portion of the reservoir 24 formed between the orifice plate and orifice plate holder, while they are held in the tilted position until the material hardens and adheres to the orifice plate and orifice plate holder. The same procedure is used on the opposite end of the assembly.

Forming the acoustical dampers in situ is a manually time consuming process and as previously mentioned the bumpers tend to deteriorate after extended use contaminating the working fluid and ultimately causing blocking of the orifices in the orifice plate.

In order to overcome the difficulties and complexity in forming the acoustical dampers 34 on the orifice plate, investigations were carried out to produce an orifice plate holder with an integral acoustical damper. It was thus discovered, that by the use of at least one sharply tapered end portion on the elongated opening in the orifice plate holder 14, the same result could be accomplished as by the use of a separate acoustical damper 34 without the attendant difficulties.

Two alternative embodiments have been developed, both of which appear to satisfactorily suppress reflected wave motion in the vibrating portion of an orifice plate. A first such embodiment of orifice plate holder is illustrated in FIG. 6 and designated 40. It produces a vibrating portion 41 of the configuration illustrated in FIG. 5.

The orifice plate holder 40 of this first embodiment has a single sharply tapered end portion 42 formed in the central elongated opening in the holder 40 at the end remote from the position where the stimulator 16 contacts the orifice plate, and is provided with a slightly radiused apex 44. The opposite end portion 46 adjacent the position where the stimulator means 16 contacts the surface of the orifice plate at 48, forming a squared off end with a transverse flat surface and radiused corners blending into the sides of the central portion of the opening.

Figure 10:
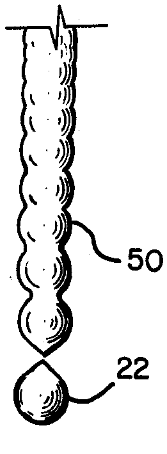
FIG. 10 is an enlarged view of a filament forming an idealy configured drop of working fluid.
Figure 11:
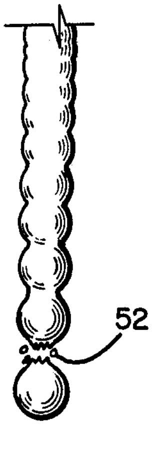
FIG. 11 is an enlarged view of a filament forming a drop and satellite droplets as occurs when reflected waves are present in the orifice plate.

It has been discovered that with this particular arrangement substantially all of the reflected wave motion is suppressed by the single sharply tapered end portion 42. This produces drops 22 formed at the ends of filaments 50, such as illustrated in FIG. 10. Whereas, if the reflected wave motion is not suppressed it will interfere with the formation of drops by causing satellite drops 52, such as illustrated in FIG. 11. This is the condition which would occur when the prior art acoustical bumpers were not functioning properly or if they were not used at all.

The positioning of the contact point 48 of the stimulator or the orifice plate relative to the end portions of the orifice plate holder may necessitate the use of an orifice plate holder having sharply tapered end portions on both ends thereof. Therefore, a second alternative embodiment of the present invention is contemplated as is illustrated in FIG. 8, and designated 53 wherein the end portions 54 and 56 are both tapered to suppress reflected wave motion.

Figure 5:
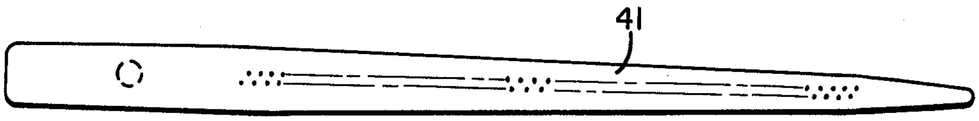
FIG. 5 is a schematic view of the vibrating portion of an orifice plate with one sharply tapered end portion as would occur in utilizing a preferred embodiment of an orifice plate holder in accordance with the present invention.
Figure 6:
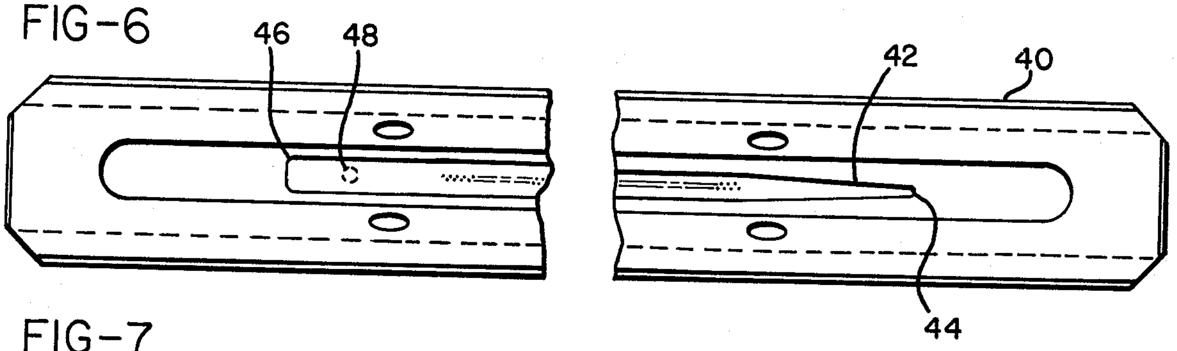
FIG. 6 is a top plan view of an orifice plate and orifice plate holder which would produce the pattern illustrated in FIG. 5.

The configuration of the vibrating portion 58 produced by this second embodiment of the orifice plate holder 53 is also different from the first embodiment illustrated in FIG. 5, in that it is tapered from one end to the other as a result of a corresponding taper in the orifice plate holder 53 converging from end portion 56 to end portion 54. The purpose of this tapered central portion 58 is disclosed in United States Patent No. 3,882,508, which is basically that of reducing attenuation of the wave propogation along the length of the vibrating portion as the wave moves from the point of contact of the stimulator at the wider end of the taper towards the narrower end. This tapered central portion 58 forms no part of the present invention and is merely illustrated as an alternative preferred form of the central region of the orifice plate holder.

Figure 7:
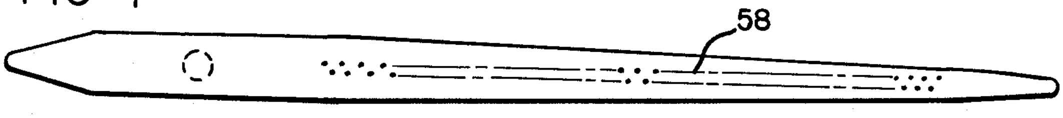
FIG. 7 is a schematic view of the vibrating portion of the orifice plate produced by an alternative embodiment of the orifice plate holder of the present invention.
Figure 8:
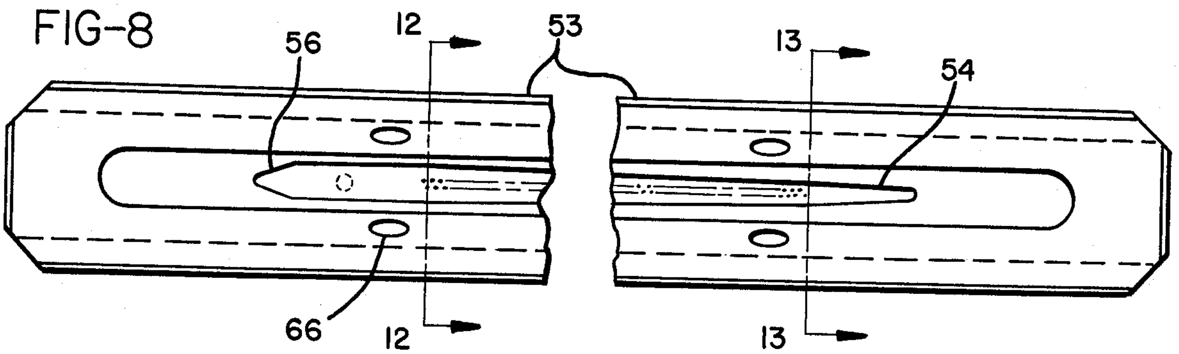
FIG. 8 is a top plan view of the alternative embodiment of the present invention which would produce the vibrating portion of the orifice plate illustrated in FIG. 7.
Figure 12:
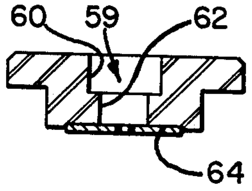
FIG. 12 is a view along line 12—12 of the orifice plate illustrated in FIG. 8.
Figure 13:
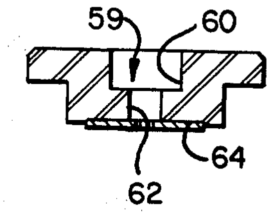
FIG. 13 is a view along line 13—13 of the orifice plate illustrated in FIG. 8.

FIGS. 12 and 13 illustrate cross sections through the embodiment of FIG. 8 showing the internal construction of the orifice plate holder 53 with a stepped reservoir 59 having a larger rectangular upper portion 60 and narrower tapered lower portion 62. The lower portion 62 is in the form of the vibrating portion 58 of the orifice plate as illustrated in FIG. 7, and has its lower walls in abutting relation to the vibrating portion of the orifice plate, with the remainder of the orifice plate secured to the bottom surface 64 so as to limit the vibration in the plate to the vibrating portion.

In either embodiment the orifice plate holders are made sufficiently thick relative to the orifice plates that the orifice plate, other than the vibrating portion can, be held stationary. The orifice plate holders can be made of any suitable material such as steel, brass, or plastic so long as it is sufficiently rigid for the material to accomplish the necessary task of preventing the vibration of the orifice plates other than the vibration portion thereof.

As an example of the relative proportions of the sharply tapered portions of the orifice plate holders of the above described embodiments relative to the overall length of the vibrating portion of the orifice plate, a metal orifice plate holder of the type illustrated in FIG. 6 was tested with a thickness of approximately 0.187 inch, an overall length of the central opening having the configuration of the vibrating portion 41 illustrated in FIG. 5, of approximately 14.65 inches, with the central portion exclusive of the sharply tapered portion approximately 13.4 inches long and tapering in width from 0.27 inch to 0.185 inch, and the sharply tapered end portion 32 approximately 1¼ inches long with a radius on the apex of 0.03 inch. The contact point 48 of the stimulator with the orifice plate was approximately 9/10 of an inch or ¾ of a wavelength from the end 46 of the orifice plate holder. This configuration reinforces the traveling wave and provides satisfactory results of substantially suppressing all reflected wave motion and eliminated formation of satellite drops 52.

It was also discovered that some tuning of the particular orifice plate design may be accomplished by moving the orifice plate holder and orifice plate relative to the stimulator means. This can be accomplished, for example, by providing elongated holes 66, as illustrated in FIG. 8, at the positions where the orifice plate holder is bolted to the main mounting frame of the recording head, so that the orifice plate and the orifice plate holder can be moved longitudinally relative to the stimulator. The fine adjustment is to achieve best stimulation by phase matching.

The ability to move the orifice plate and orifice plate holder relative the stimulator permits the optimizing of the position of contact of the stimulator point with the orifice plate such taht "cusps" i.e., reflected waves, can be substantially eliminated. It has been found that at various frequencies of vibration of the orifice plate, a change in location of the plate relative to the stimulator can be effected which optimizes the suppressive effect of the acoustical dampers of the present invention for a given frequency. This provides some range of effective operation of the acoustical dampers for variations in frequency of excitation. This can also be accomplished to some degree by using an eccentrically mounted stimulator tip for contacting the orifice plate, which is mounted to the stimulator in such a manner that it can be rotated so as to contact the orifice plate at different locations in the locus of a circle.

As mentioned above, the exact dimensions of the sharply tapered end portion or portions of the orifice plate holder of the present invention cannot be established by conventional design practices and a certain amount of experimentation is necessary. However, basic parameters do exist which substantially reduce the amount of experimentation necessary to find a functional orifice plate holder in accordance with the present invention.

As mentioned in U.S. Pat. No. 3,882,508, referred to above, a consideration of the widthwise resonance mode of vibration of the vibrating portion of the orifice plate is essential to proper functioning of the device. The width of the vibrating portion of the orifice plate necessary to sustain the primary mode of widthwise vibration without sustaining higher modes can be calculated in a well known manner. This permits the orifice plate to be designed to prevent additional modes of vibration from interfering with the primary widthwise mode, thus making drop formation more uniform.

Figure 9:
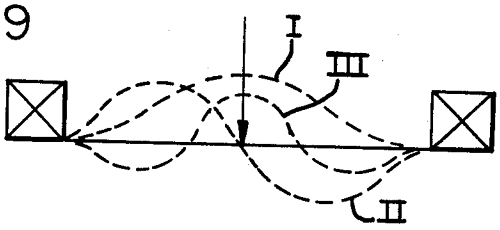
FIG. 9 is a schematic illustration of first, second and third order widthwise resonance modes for an orifice plate.

It is therefore necessary that the vibrating portion of the orifice plate of the present invention, exclusive of the sharply tapered end portions, must be sufficiently wide to sustain a first mode of widthwise resonance, but is preferably of lesser width than that necessary to sustain a second mode of widthwise resonance. These conditions or modes of vibration are illustrated in FIG. 9 in which the primary or first widthwise resonance mode is designated I, the second widthwise resonance is designated II, and a third widthwise resonance mode is designated III.

In view of the above requirements for the main vibrating portion of the orifice plate it is therefore necessary that the widest end of the sharply tapered end portion or portions of the present invention must be within the width range necessary to sustain first mode widthwise resonance but less than the width required to support second mode widthwise resonance. Also, the tip or apex of the sharply tapered end portions must have a width or radiused end with a diameter which is substantially less than the width necessary to support first mode widthwise vibration of the orifice plate.

The distinction between the function of the tapered central portion of the second above disclosed embodiment from the function of the sharply tapered end portion is substantial, since the first mentioned taper is intended to sustain vibration of the orifice plate and reduce attenuation, while the second mentioned taper is intended to stop vibration without producing reflected wave motion along the vibrating portion of the orifice plate. In view of this, it is also obvious that the sharply tapered end portion should begin after the pattern of orifices within an orifice plate, since beginning of dampening by the sharply tapered end portions prior to this point would have a detrimental effect on the production of the desired droplets from the filaments being produced at the end of the orifice plate.

Also, although it is desired that the sharply tapered end portion theoretically extend to a point, it is understood that practical considerations of machining and other methods of forming a sharply tapered end portion in the orifice plate holder necessitates a radiusing of the end portion, and it is believed that for the general configuration of the example illustrated above, the radius should not be greater than 0.030 inch thus giving a maximum width of 0.060 inch.

Although the foregoing illustrates the preferred embodiments of the present invention, many variations are possible. All such variations as would be obvious to one skilled in this art are intended to be included within the scope of the invention as defined by the following claims.

What is claimed is:

1. An orifice plate holder for use in a jet drop printing apparatus wherein an orifice plate having a plurality of orifices is secured thereto for controlled vibrational stimulation of a plurality of filaments of fluid flowing from said orifices, comprising:

a generally rectangular cross sectioned plate, substantially co-extensive with said orifice plate and having an elongated central opening with two end portions defined therein, the walls of said opening being co-extensive with and abutting a vibrating portion of said orifice plate containing said plurality of orifices, said opening being further defined with at least one of said end portions formed by convergingly tapered portions of said walls, said one end portion extending for substantially less than one half of the length of said opening and so configured as to dampen vibration of said orifice plate at a position corresponding to said at least one end portion so as to suppress backwardly directed reflections of waves traveling through said vibrating portion of said orifice plate.

2. An apparatus as defined in claim 1 wherein both said end portions are tapered so as to dampen vibrations of said orifice plate at positions corresponding to said end portions so as to suppress backwardly directed reflections of waves traveling through said vibrating portion of said orifice plate.

3. An apparatus as defined in claim 1 wherein said walls of said opening other than said end portions, are substantially parallel.

4. An apparatus as defined in claim 1 wherein said walls of said opening other than said end portions, are continuously convergingly tapered from another said end portion to said one end portion.

5. An apparatus as defined in claim 2 wherein said walls of said opening other than said end portions are parallel.

6. An apparatus as defined in claim 2 wherein said walls of said opening other than said end portions, are continuously convergingly tapered from said one end portion to another.

7. An apparatus as defined in claim 1 wherein said vibrating portion of said orifice plate is stimulated from an end portion opposite said one tapered end portion.

8. An apparatus as defined in claim 1 wherein said holder and said orifice plate are fixed relative to one another and adjustably positionable relative to a stimulation means, so as to permit sufficient relative movement to optimise the dampening of vibration of said orifice plate so as to substantially remove reflected wave motion.

9. An apparatus as defined in claim 2 wherein said holder and said orifice plate are fixed relative to one another and adjustably positionable relative to a stimulation means, so as to permit sufficient relative movement to optimise the dampening of vibration of said orifice plate so as to substantially remove reflected wave motion.

10. An apparatus as defined in claim 1 wherein the width of the widest portion of said at least one sharply tapered end portion is sufficiently wide to support a first mode widthwise resonance vibration and sufficiently narrow to prevent a second mode widthwise resonance vibration, the length of said sharply tapered end portion being about 2 and 3 wavelengths long and the apex of said at least one sharply tapered end portion is radiused with a diameter substantially less than the width necessary to support said first mode widthwise resonance vibration.

11. An apparatus as defined in claim 10 wherein said at least one tapered end portion is about 1.25 inches long, said widest portion of said at least one tapered end portion is about 0.270 inch, said radiused apex has a diameter of about 0.060 inch, and said orifice plate has a thickness of about 0.087 inch.

* * * * *